(12) United States Patent
Alon (10) Patent No.: US 10,175,748 B2
(45) Date of Patent: Jan. 8, 2019

(54) SYSTEM, METHOD AND COMPUTER PROGRAM PRODUCT FOR IMPROVED REGULATION OF AN ELECTRICAL DEVICE'S CONSUMPTION OF POWER FROM AN EXTERNAL POWER SUPPLY (71) Applicant: NUVOTON TECHNOLOGY CORPORATION, Hsinchu (TW)

(72) Inventor: Moshe Alon, Tel Aviv (IL)

(73) Assignee: NUVOTON TECHNOLOGY CORPORATION, Hsinchu (TW)

(*) Notice: Subject to any disclaimer, the term of this patent is extended or adjusted under 35 U.S.C. 154(b) by 105 days.

(21) Appl. No.: 15/399,566

(22) Filed: Jan. 5, 2017

(65) Prior Publication Data
US 2018/0188800 A1 Jul. 5, 2018

(51) Int. Cl.
*G06F 1/32* (2006.01)

(52) U.S. Cl.
CPC .......... *G06F 1/3296* (2013.01); *G06F 1/3206* (2013.01)

(58) Field of Classification Search
CPC .............................. G06F 1/3296; G06F 1/3206
See application file for complete search history.

(56) References Cited

U.S. PATENT DOCUMENTS

| 2003/0110423 | A1* | 6/2003 | Helms | G06F 1/206 714/100 |
| 2004/0128101 | A1* | 7/2004 | Hermerding, II | G01K 7/42 702/136 |
| 2005/0071691 | A1* | 3/2005 | Pomaranski | G06F 1/263 713/300 |
| 2007/0124622 | A1* | 5/2007 | Johns | G01K 3/005 713/501 |

OTHER PUBLICATIONS

"Item #: PSM03A-090, 9V Wall Plug-In Adaptor," TRC Electronics, Inc. [http://www.trcelectronics.com/View/Phihong/PSM03A-090.shtml].
"AEJ36 Series," XP Power, [http://www.xppower.com/Portals/0/pdfs/SF_AEJ36.pdf?ver=2016-07-25-090547-007].

* cited by examiner

*Primary Examiner* — Terrell S Johnson
(74) *Attorney, Agent, or Firm* — Oliff PLC (57) ABSTRACT A personal computer or other electronic device may be powered by an external power supply and may have a legacy ambient temperature sensor e.g. because a fan whose speed is controlled by a controller, uses as an input, inter alia, ambient air temperature received from the legacy temperature sensor which may be disposed adjacent the fan. A controller may be provided which limits the current based on ambient air temperature reading/s flowing out of the sensor thereby to optimize power consumption relative to conventional "worst-case-assumption based" control of the current, in which current supplied is limited, mindful of a pre-set worst-case temperature assessment, to an un-necessarily low level of current.

20 Claims, 6 Drawing Sheets

301a. Provide a Max System power vs ambient temperature graph including first and second curves e.g. as shown in Fig. 2, or other table or data or formula operative to determine a maximal current as a function of reading/s from legacy intake air temperature sensor e.g. in the system controller non-volatile memory 43 of Fig. 1.

↓

301b. System Controller 40 performs measurement of the ambient temperature

↓

302. System Controller 40 measures the system power.

↓

303. If the System power most recently measured is below the solid curve in the graph of Fig. 2 go to operation 308, else:
if the CPU throttling signal (e.g. 37 in Fig. 1) is not asserted, assert and continue to operation 304. Else go to operation 305.

↓

304. System Controller 40 measures the system power.

↓

305. If the System power most recently measured is below the solid curve (say) in the graph of Fig. 2 go to operation 313, else
if a first system element (function or module) connected to, hence controlled by, the power distribution circuit (50) is not asserted, set a first one of the control signals 38 associated with the first system element, thereby to disconnect the first system element, and go to operation 306, else (i.e. if asserted) go to operation 307.

↓

Go to Fig. 4b, operation 306

Fig. 4b

From Fig. 4a, operation 305

↓

306. System Controller 40 measures the system power.

↓

307. If the System power most recently measured is below the solid curve in the graph of Fig. 2 go to operation 313, else power off a next system element by asserting another one of the control signals 38, and go to operation 306.

↓

308. If any of the system elements is disconnected and the power is below the dashed curve in the graph of Fig. 2, then re-connect a disconnected system element e.g. the system element most recently disconnected by asserting one of the control signals 38. Else go to operation 310.

↓

309. System Controller 40 measures the system power and go to operation 308.

↓

310. If the CPU throttling signal is asserted, de-assert.

↓

311. System Controller 40 measures the system power.

↓

312. If the System power most recently measured is below the solid curve in the graph of Fig. 2 go to operation 313, else assert the CPU throttling signal and go to operation 313.

↓

313. Wait for a suitable time period, perhaps 10 ms or 100 ms, and return to operation 301.

Fig. 5

A. provide apparatus of fig. 1

↓

B. define a system policy including a priority level for each or at least some power related element e.g. each or at least some power consuming functionalities or components in the system

↓

C. provide conversion table/s e.g. as described herein and store in computer memory e.g. a first table, Table 1, may indicate the ambient temperature for each measurement value of the ambient intake air temperature sensor ) and a second table, Table 2, which associates the ambient temperature computed from Table 1, with a maximal allowed power consumption

Fig. 6

610: Provide an electrical device drawing current from an external power supply, the electrical device including a housing, an air temperature sensor disposed interiorly of said housing, and a computing device operative: to repeatedly receive temperature samples from the air temperature sensor and, responsively, to perform at least one functionality (such as but not limited to fan speed regulation) other than regulating current drawn by the electrical device from the external power supply; and to generate at least one output which regulates current drawn by the electrical device from the external power supply, said output based on at least one variable other than said temperature samples

↓

620: Provide a data repository on the computing device storing data which stipulates, for each of a plurality of air temperature levels, a level of current to be drawn by the electrical device from the external power supply

↓

630: Store Logic on the computing device which repeatedly accesses said data based on at least one of said received temperature samples thereby to retrieve levels of current; and generates outputs which regulate current drawn by the electrical device from the external power supply, wherein said outputs equal said retrieved levels of current

SYSTEM, METHOD AND COMPUTER PROGRAM PRODUCT FOR IMPROVED REGULATION OF AN ELECTRICAL DEVICE'S CONSUMPTION OF POWER FROM AN EXTERNAL POWER SUPPLY

REFERENCE TO CO-PENDING APPLICATIONS

No Priority is claimed.

FIELD OF THIS DISCLOSURE

The present invention relates generally to electrical devices and more particularly to power consumption features thereof.

BACKGROUND FOR THIS DISCLOSURE

Power supplies have an efficiency rating: the higher the efficiency, the less power wasted, and/or the less heat generated. For example, a power supply whose efficiency rating is 80 percent provides 80 percent of its rated wattage to the system it is powering and loses 20% in the form of heat.

Available power supplies include stand-alone ("external") devices, as well as those built into larger devices along with the larger devices' respective loads. Examples of the latter include power supplies embedded in desktop computers and consumer electronic devices. Currently, an external power supply is used in many PC systems. For Notebook PC systems this has been the common design practice for some time. As DT (desktop) systems become smaller and smaller, use of external power supply has become a common design practice for DT computers as well.

Conventionally, the limit on current to be drawn by the computer (say) from the external power supply is set to maximal value based on worst case scenario with maximal ambient temperature. The maximal ambient temperature may, conventionally, be determined based on expected usage.

Once the maximal ambient temperature has been determined, the maximal current (limit) is derived, e.g. using a suitable formula which expresses the relation of ambient temperature and maximal power consumption and is dependent on the power supply implementation. Since power supplies are not 100% efficient, the power lost inside the power supply generates heat. For a specific loss, a specific gradient between power supply temperature and external temperature is needed. So, if the ambient temperature is low, the power supply temperature will be lower, in which case the internal electronic components of the power supply are colder. Often, electronic components are more efficient in lower temperatures and can therefore deliver more current compared to hot components. For example an on-resistance vs. junction temperature graph for a 2N7002W FET transistor (say) shows an increase in drain source resistance over temperature. Power loss over the FET is proportional to resistance. When the temperature is higher, power loss over the FET is higher. So, at low temperature more current can be transferred by the FET with the same power loss.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a system and method for improved regulation of an electrical device's consumption of power from an external power supply based on intake air flow temperature measured by a legacy temperature sensor used e.g. for system thermal management in the electrical device e.g. computer. It is appreciated that some conventional computers, such as but not limited to IBM®'s Power® System S812LC (8348-21C), have ambient sensors for measuring intake air temperature.

Given an external power supply, and an electrical device e.g. computer powered by that external power supply and having the following internal elements: an optional fan with fan speed control, and an ambient temperature sensor e.g. for the fan's speed control, certain embodiments seek to provide logic receiving a measured value from the temperature sensor and generating control signals that are used to limit the system power e.g. by CPU clock throttling, or by reducing or cutting voltage into system elements using, say, suitable power distribution circuitry.

Certain embodiments of the present invention seek to provide a system which estimates the actual ambient temperature surrounding a power supply and determines, accordingly, a level of current which can be consumed from the power supply.

Certain embodiments of the present invention seek to provide a system e.g. controller for controlling operation of a first device (such as but not limited to a power supply) using control logic affected by a temperature parameter characterizing the first device, where the control logic estimates the temperature parameter at least partly as a function of at least one reading from an internal temperature sensor, disposed interiorly of a second device (such as but not limited to a personal computer) which is housed separately from the first device. The controller may include one or more hardware devices e.g. chips, which may be co-located or remote from one another.

Certain embodiments of the present invention seek to provide code e.g. controller logic which accesses a pre-configured representation in memory, of a relationship between current that the power-requiring device is entitled to consume from the power supply, and at least one temperature reading e.g. one or more of: a single current reading, a combination e.g. central tendency of several recent readings, an estimated first or higher order derivative of readings indicating whether temperature is stable, rising or decreasing and even to what extent.

Certain embodiments of the present invention seek to provide an apparatus e.g. controller or processor which is configured to receive at least one temperature reading from an ambient temperature sensor deployed interiorly of a device drawing power from an external power source, and, accordingly, directly or indirectly, to control the current drawn by the device from the power source. Indirect control may for example include embodiments in which the apparatus comprises a controller (typically deployed in the device drawing power, or less typically elsewhere e.g. in the power source), and the device's CPU selectably increases and decreases power drawn from the external power source, based on data provided to the CPU by the controller.

Certain embodiments of the present invention seek to provide firmware that has control over system power consumption and/or that alerts a host when power consumption exceeds a preset ambient temperature-determined power limit. The firmware may for example be used in conjunction with a legacy device e.g. PC having an ambient temperature sensor, functionality to monitor device-consumed power and control over system power.

Certain embodiments of the present invention seek to provide at least one processor in communication with at least one memory, with instructions stored in such memory executed by the processor to provide functionalities which are described herein in detail.

The following terms may be construed either in accordance with any definition thereof appearing in the prior art literature or in accordance with the specification, or as follows:

A "power supply"—which may include an electric power converter, PSU, voltage regulator—is intended to include any electronic device that supplies electric energy to an electrical load, e.g. by converting a first level or type of electrical energy to another, second level or type. For example, a PSU may convert mains AC to low-voltage regulated DC power for a computer's internal components. Desktop personal computer power supplies often conform to the ATX specification. Corsair, Seasonic, and Antec are examples of PSU manufacturers. A PSU typically includes various internal components including a cooling fan typically provided to cool internal power supplies disposed interiorly of the PSU.

Intake airflow temperature: is intended to include a value measured by a legacy temperature sensor (aka ambient air sensor) deployed inside an electronic device e.g. PC, and used as an input by control logic governing speed of the electronic device's legacy fan.

Ambient temperature of power source, aka surrounding temperature: Correlated with intake air flow temperature since the external power supply and the electronic device are normally located in the same surroundings and may be assumed to be the same.

Environment temperature: temperature of air that surrounds the external power supply. For external power supplies, environmental temperature can typically be reliably estimated by intake ambient temperature.

Maximal environment temperature: a value stipulated by an external power supply distributor and used by the power supply distributor to determine a maximum allowable current stipulated for the external power supply.

External power supplies—aka power adaptors, AC adaptors, plug packs, power packs—are intended to include those operative to recharge or power any electronic device, such as but not limited to computers including laptops, mobile phones, modems, printers. External power supplies are often distributed along with the electronic device they power, but the electronic device and the standalone or "external" power supply constitute separate boxes, rather than the power supply being built into the device.

Electrical device, aka electronic device: is intended to include any electrical e.g. electronic device including but not limited to a computer; typically the device includes a CPU.

Controller: e.g. on the motherboard, such as a Super I/O in DT (desktop personal computer) systems or an Embedded Controller e.g. on NB (notebook personal computer) systems.

The present invention typically includes at least the following embodiments:

Embodiment 1

Apparatus for regulating current to be drawn by an electrical device from an external power supply, the electrical device comprising an air temperature sensor, the apparatus comprising: a computing device (e.g. processor or controller) including logic which repeatedly computes a maximal current to be drawn from the external power supply, including receiving at least one reading from the air temperature sensor and computing the maximal current accordingly; and a current limiting device to limit current drawn from the external power supply to no more than the maximal current.

Embodiment 2

Apparatus according to according to any of the preceding embodiments wherein the computing device is deployed interiorly of the electrical device.

Embodiment 3

Apparatus according to any of the preceding embodiments wherein the receiving and computing comprises receiving plural readings from the temperature sensor and combining the plural readings to obtain a more robust temperature indication.

Embodiment 4

Apparatus according to any of the preceding embodiments wherein the receiving and computing comprises receiving plural readings from the temperature sensor and comparing the plural readings to determine whether the air temperature is stable, increasing or decreasing, and computing a maximal current which is smaller if the temperature is increasing than if the temperature is decreasing.

Embodiment 5

Apparatus according to any of the preceding embodiments wherein the current limiting device is operative:

to reduce, from a present level down to a new level lower than the present level, current supplied to at least one current-drawing, at present non-critical, component of the electrical device, if the total current drawn from the external power supply is apt to exceed the maximal current unless the current the non-critical component is drawing from the external power supply is reduced from the present level;

and to increase, from the new level to a newer level higher than the new level, current supplied to the non-critical component when the current drawn from the external power supply is no longer apt to exceed the maximal current even if the non-critical component is again free to draw current from the external power supply at the newer level.

It is appreciated that any component may be predefined as non-critical. For example a USB port used for charging can be deemed non-critical and temporarily disconnected e.g. as described above in case of high system power demand, USB-type-C speakers volume or Base level can be reduced etc.

A component may even be predefined as critical in some situations or times and non-critical at other situations and times (e.g. non-critical as long as the current supplied is at least a certain level, or non-critical except when current has already been denied for too long a duration, etc.). Then current may be partly or completely denied to that component if the component is at present non-critical but is not completely denied and perhaps is not even partially defined to that component otherwise i.e. component if the component is at present critical.

Embodiment 6

Apparatus according to any of the preceding embodiments wherein the electrical device comprises a computer.

Embodiment 7

Apparatus according to any of the preceding embodiments wherein the computer comprises a CPU clock and wherein the current limiting device comprises a clock throttling device operative to selectably throttle the CPU clock thereby to reduce the CPU power consumption.

Embodiment 8

Apparatus according to any of the preceding embodiments wherein the electrical device comprises a computer.

Embodiment 9

A method for regulating current to be drawn by an electrical device from a power supply, the electrical device comprising a legacy air temperature sensor, the method comprising:
configuring a computing device with logic which repeatedly computes a maximal current to be drawn from the power supply, including receiving at least one reading from the air temperature sensor and computing the maximal current accordingly; and
using a current limiting device to limit current drawn from the power supply to no more than the maximal current.

Embodiment 10

A method according to any of the preceding embodiments wherein the legacy air temperature sensor comprises an air temperature sensor providing air temperature readings to legacy fan speed control logic controlling speed of a legacy fan in the electrical device.

Embodiment 11

A method according to any of the preceding embodiments wherein the power supply comprises an external power supply housed separately from the electrical device.

Embodiment 12

A system for regulating current to be drawn by an electrical device from an external power supply, the electrical device including a housing, an air temperature sensor disposed interiorly of the housing, and a computing device operative:
to repeatedly receive temperature samples from the air temperature sensor and, responsively, to perform at least one functionality other than regulating current drawn by the electrical device from the external power supply; and
to generate at least one output which regulates current drawn by the electrical device from the external power supply, the output based on at least one variable other than the temperature samples,
the system comprising:
a data repository on the computing device storing data which stipulates, for each of plural air temperature levels, a maximal level of current to be drawn by the electrical device from the external power supply; and
logic stored on the computing device which repeatedly accesses the data based on at least one of the received temperature samples thereby to retrieve maximal levels of current; and generates outputs which regulate current drawn by the electrical device from the external power supply, wherein the outputs equal the retrieved maximal levels of current.

Fan speed may for example be controlled according to a pre-stored graph of temperature vs. fan speed.

It is appreciated that any suitable computing device may be employed e.g. any general processor or controller or customized element with processing power having a legacy air temperature input provided by an internal temperature measurement capability, and a legacy current regulation output, may be used to implement the system of claim 12. For example, an internal controller such as, say, Super-IO in a PC desktop system, an embedded controller in a Notebook system or BMC in Server system, may be employed. This may be useful for computer systems, printers or any other household or industrial or outdoor equipment relying on an external power supply.

It is appreciated that in generating at least one output which regulates current drawn by the electrical device from the external power supply, the output may be based at least partly on any suitable variable/s other than the temperature samples. For example, current regulation e.g. For pc systems may be at least partially governed by cpu temperature, and when the CPU temperature climbs too high the PROCHOT# signal may cause the CPU clock to throttle resulting in decreased CPU power consumption.

Embodiment 13

A system according to any of the preceding embodiments wherein the functionality comprises fan speed regulation.

Embodiment 14

Apparatus according to any of the preceding embodiments wherein the current limiting device comprises a voltage level reduction device.

Embodiment 15

Apparatus according to any of the preceding embodiments wherein the newer level is the present level such that the current limiting device is operative to restore current supplied to the non-critical component to its pre-reduced level.

Embodiment 16

Apparatus according to any of the preceding embodiments wherein the current limiting device is operative:
to disconnect the non-critical current-drawing component if the total current drawn from the external power supply is apt to exceed the maximal current unless the present non-critical component is prevented from drawing current from the external power supply;
and to reconnect the non-critical component when the current drawn from the external power supply is no longer apt to exceed the maximal current even if the non-critical component is free to draw current from the external power supply.

Embodiment 17

Apparatus according to any of the preceding embodiments wherein the current limiting device uses PROCHOT signals for CPU clock throttling thereby to limit power.

Embodiment 18

Apparatus according to any of the preceding embodiments wherein the current limiting device comprises power distribution circuitry.

Embodiment 19

A computer program product, comprising a non-transitory tangible computer readable medium having computer readable program code embodied therein, the computer readable program code adapted to be executed to implement a method for regulating current to be drawn by an electrical device from a power supply, the electrical device comprising a legacy air temperature sensor, the method comprising:

configuring a computing device with logic which repeatedly computes a maximal current to be drawn from the power supply, including receiving at least one reading from the air temperature sensor and computing the maximal current accordingly; and using a current limiting device to limit current drawn from the power supply to no more than the maximal current.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein.

The embodiments referred to above, and other embodiments, are described in detail in the next section.

Any trademark occurring in the text or drawings is the property of its owner and occurs herein merely to explain or illustrate one example of how an embodiment of the invention may be implemented.

The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable computerized data storage e.g. computer memory may be used to store information received by or generated by the systems shown and described herein.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof.

Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

DETAILED DESCRIPTION OF CERTAIN EMBODIMENTS

Conventional electrical systems e.g. personal computers are typically aware of the input power arriving from the external power supply (aka voltage regulator output power) and may include either:

I. a meter to measure the current or power drawn from the external power supply, or II. a controller interface operative to receive an analog or digital power level indication coming from the external supply. Analog or digital information provided by the power supply may include an indication for the current power consumption (e.g. voltage level, frequency, digital data provided through SMbus or SPI interface)

III. in some cases the device can be functional when the external power is within a range (e.g. input voltage ranging from 12V to 8V), in which case the output voltage of the external power supply's voltage regulator can be used as a power consumption indication. In the above example, 12V may represent low power consumption, whereas 8V may represent high power consumption.

Distributers of conventional external supply devices typically stipulate a maximal power consumption rating as well as a maximal environment temperature. For Example, the Following Web-Page: http://www.trcelectronics.com/View/Phihong/PSM03A-090.shtml indicates that the PSM03A-090 plug-in stipulates a maximal power consumption rating of 3 W and a maximal environment temperature of 40° C.; 40 degrees Celsius being a common value stipulated for maximal environment temperature, whereas the following web-page: http://www.xppower.com/Portals/0/pdfs/SF_AEJ36.pdf?ver=2016-07-25-000547-007 indicates that the AEJ36 plug-in has a maximal power consumption rating of 20-36 W, depending on the model number, and a maximal environment temperature of 60° C.

The maximal environment temperature which the power supply is guaranteed to tolerate is stipulated by the power supply distributor, having been determined as a function of the power supply design. Then, the maximal power rating to be stipulated by the distributor of the power supply is determined by the distributor, as a function of the maximal environment temperature to be accommodated. The distributor may determine the max power rating, once maximum temperature is known, by first determining the max power limit for the power supply and then, selecting the component of the power supply given the package and the operation temperature. To compute the max power consumption for a given ambient temperature, use Tb and Rt, compute max Ploss and, using a power supply efficiency factor, compute the maximal power consumption per each possible ambient temperature level.

All is well if the power supply deployed for a given system e.g. computer or other electronic device, is able to accommodate these stipulated system needs under all conditions including high environment temperature. However, it may be the case that the power supply deployed for a given computer (say) is unable to accommodate these stipulated system needs under certain conditions e.g. high environment temperature. For example, new standards and/or system architectures emerge ex post facto and the power supply designed to accommodate a previous generation specific system under worst case conditions which were reasonable for that previous generation, is not allowed, by virtue of the distributers' technical specification, to provide a level of power sufficient to satisfy the high power requirement of the more modern PC system. For example, a deployed external power supply may have been designed to support a previous generation computer system, including a CPU on a motherboard with an internal hard drive and standard graphics. Subsequently, the USB type C standard emerges ex post facto and allows external devices to consume up to 100 Watts from a single USB type C connection. This unanticipated USB type C connection is designed to allow a computer to power external hard drive external high power speakers and/or an external display, but the deployed external power supply becomes inadequate. A system may be provided with two (or more) power supply options, one more costly than the other; according to certain embodiments described herein, at moderate temperatures the less costly power supply can be used to provide the required power.

Certain embodiments of the present invention harness the fact that in normal everyday use, the environment temperature is much lower than the power supply's stipulated environment maximal specified temperature. For example, the room temperature in which a particular computer or other electronic device is being used may never rise over 25 degrees C., whereas the maximal environment temperature for a power supply deployed in the room may be as high as 60 degrees C., yielding a difference of 35 degrees C. Therefore, the power supply may provide more power than the worst case specified power and may be able to power a PC system that draws more current than specified for worst case conditions.

Figure 1:
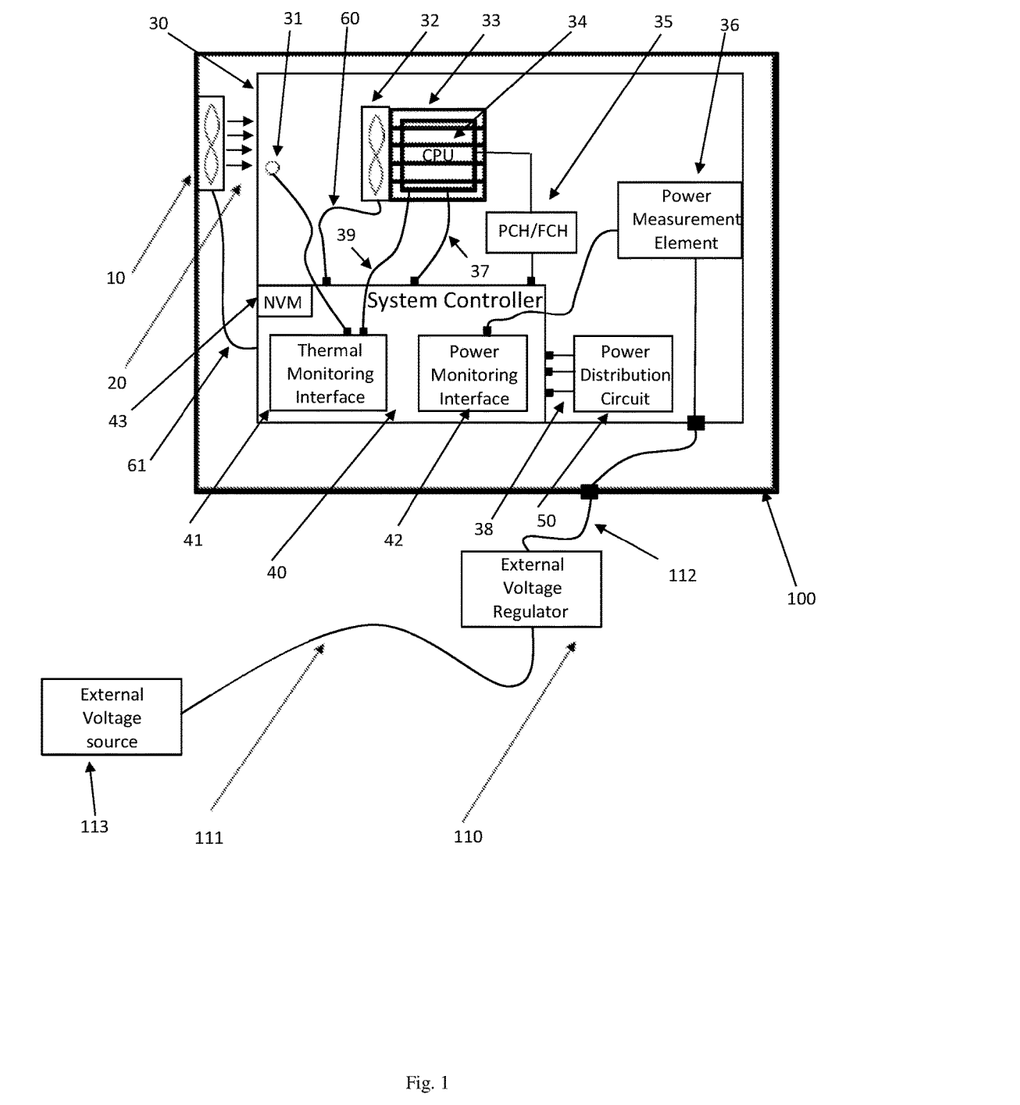
FIG. 1 is a simplified semi-pictorial semi-block diagram illustration of an electrical device configured for improved regulation of consumption of power from an external power supply.

Certain embodiments of the present invention, e.g. as shown in FIG. 1, provide an apparatus for regulating current to be consumed by an electrical device from an external power supply during system run time, the electrical device comprising a legacy air temperature sensor, the apparatus comprising a processor with logic which determines a maximal current to be drawn from the external power supply, including receiving at least one reading from the temperature sensor and computing the maximal current as a function of an ambient temperature derived from the at least one reading; and a current limiting device to limit current drawn from the external power supply to no more than the maximal current. The current limiting device may for example be operative to selectably disconnect components that draw current, and/or may throttle the CPU clock (e.g. by utilizing a conventional PROCHOT# signal that causes CPU clock throttling which is a conventional internal circuit in state of the art CPUs) to reduce the CPU power consumption. Conventionally, this limit is set to maximal value based on worst case scenario with maximal ambient temperature, whereas according to certain embodiments, this limit is set more leniently, relative to the conventional setting, based on an estimate of the ambient temperature derived from actual temperature measurements. This is because a higher current (power) can be consumed from the external power supply during system run time, if the ambient temperature is lower than maximal temperature, which is the typical case.

It is appreciated that when the output voltage of the regulator is substantially constant, then since P=IV (where P is Power, V is Voltage and I is Current), limiting or monitoring power is tantamount to limiting or monitoring current.

Specifically, FIG. 1 illustrates a PC system Chassis or housing 100 with a Chassis Fan (aka intake air fan) 10 generating intake air flow 20 provided for cooling. Intake air flow 20's temperature is sensed by an Intake Air Temperature Sensor 31 (e.g. Thermistor or Thermal Diode). On the motherboard 30 of chassis 100 are a CPU 34 with associated CPU fan 32 and heat sink 33 and a system controller 40 (e.g. embedded controller, Super-IO or BMC) associated with the CPU 34 via a chipset 35 (e.g. FCH for AMD or PCH for Intel). System controller 40 typically has a thermal monitoring interface 41 and a power monitoring interface 42 associated with the motherboard's resistance-based power measurement element 36. A clock throttling signal 37 may be used to reduce the CPU power consumption by throttling the CPU clock (not shown). A power distribution circuit 50 includes system elements and supply domain power switches. Control signals 38 are used to power on/off system functions, controlled by Controller 40. An external voltage regulator 110, typically associated with a low voltage DC cable 112, regulates external voltage arriving from an external power source 113 via an AC cable 111. It is appreciated that the interface between the electronic measurement device can be voltage level or SMBus or any other electrical/electronic interface.

Power distribution circuit 50 in FIG. 1, apart from being used to limit current, can also be used to control supply during various power save modes and to control the system power sequence. Since the power distribution circuit is controlled by the system controller 40, controller 40 can connect and disconnect functions using the power distribution circuit 50.

According to certain embodiments, an air temperature sensor e.g. sensor 31 in FIG. 1 provides air temperature readings to legacy fan speed control logic controlling speed of a legacy fan in the electrical device. In FIG. 1, for example, signal 60 may exert control over the CPU fan 32 such that the speed of CPU fan 32 is determined by the micro-controller 40 as shown. Also, signal 61 may exert control over the PC system fan (aka chassis fan or intake air fan). More generally, fan control may be provided by an external controller based on measured intake air temperature (e.g. at fan 10 in FIG. 1) and/or CPU temp (e.g. at CPU fan 32 in FIG. 1).

It is appreciated that while the power supply is normally hotter than the room temperature, the ambient temperature directly affects the power supply temperature, typically as per the following formula:

$Tb=(Ploss/Rt)+Tamb)$, where:

Tb is the temperature over the power supply body (the "environment temperature" for that power supply)
Tamb is the ambient temperature,
Rt is thermal resistance of the power supply,
Ploss is the Power loss converted to heat,
The constant Rt may be measured or may be provided by the power supply manufacturer in advance. Tb is expected to be within limits if power consumption is maintained within allowed power limits and allowed temperature limits. The Max Tb may be determined by applying the max power consumption from a power supply within an environment heated to the maximal allowed temperature.

In many PC (say) systems such as but not limited to The IBM® Power® System S812LC (8348-21C) system, intake airflow temperature is measured by a legacy temperature sensor, typically deployed adjacent the cooling fan responsible to sink air into the PC system and used to optimize the cooling fan's speed control. Typically, plural voltage readings provided by the sensor are averaged.

The legacy temperature sensor may for example comprise an ambient (intake) air temperature sensor e.g. thermistor or thermal diode circuit whose circuit output may be connected to a processor/controller configured in accordance with any embodiment described herein, typically via an ADC (analog-to-digital converter). Alternatively, any suitable conventional thermal measurement circuitry can be used and connected to the controller e.g. SIO/EC using SMBus or other digital bus.

The precise correlation between the intake ambient temperature and the temperature of the air adjacent the external power supply (aka surrounding temperature) may be system dependent e.g. dependent on the location of the ambient temperature sensor in each particular system. Typically, the intake ambient temperature will be either substantially the same as the surrounding temperature or slightly higher. For example, if the sensor is deployed just before the main air entry point to the system, the sensor typically reads values which may be assumed to represent the real ambient temperature. In contrast, if the sensor is located on the system board, the measured temperature may be biased, the amount of bias being based on measurements performed in advance by the system manufacturer.

For example, the ambient temperature as measured by the sensor and the external air temperature may be measured in a controlled environment. Then, one may systematically vary the temperature from the minimal work environment temperature to the maximal work environment temperature, and generate a table of the ambient temperature for each measurement value of the ambient intake air temperature sensor (31).

The table may be generated by the device (PC) manufacturer and stored, say, in the Non-Volatile Memory (NVM) of the system controller (43) of FIG. 1.

In some cases, the system power may also be a factor in which case a mapping of external temperature vs. ambient temperature measurement and system power consumption may be used. This mapping may be generated by measuring and recording system power consumption and measured Intake Air Sensor (31) temperatures at a plurality of systematically varied controlled external temperatures, e.g. by the manufacturer of the system in a controlled test environment.

This intake air temperature may be used as an estimate of, or as a basis for, an estimation of (e.g. if bias exists), the environment temperature information. Then, environment temperature information can be used in order to allow drawing more current than the maximum stipulated by the external power supply's distributor, without overheating. This is because the maximal current stipulated for the external power supply is computed to be so low as to prevent overheating, even given that the device might be at, or close to, a worst-case environmental temperature. However in practice, the external power supply's environmental temperature can be reliably established to be much lower than the worst-case temperature.

Figure 4A:
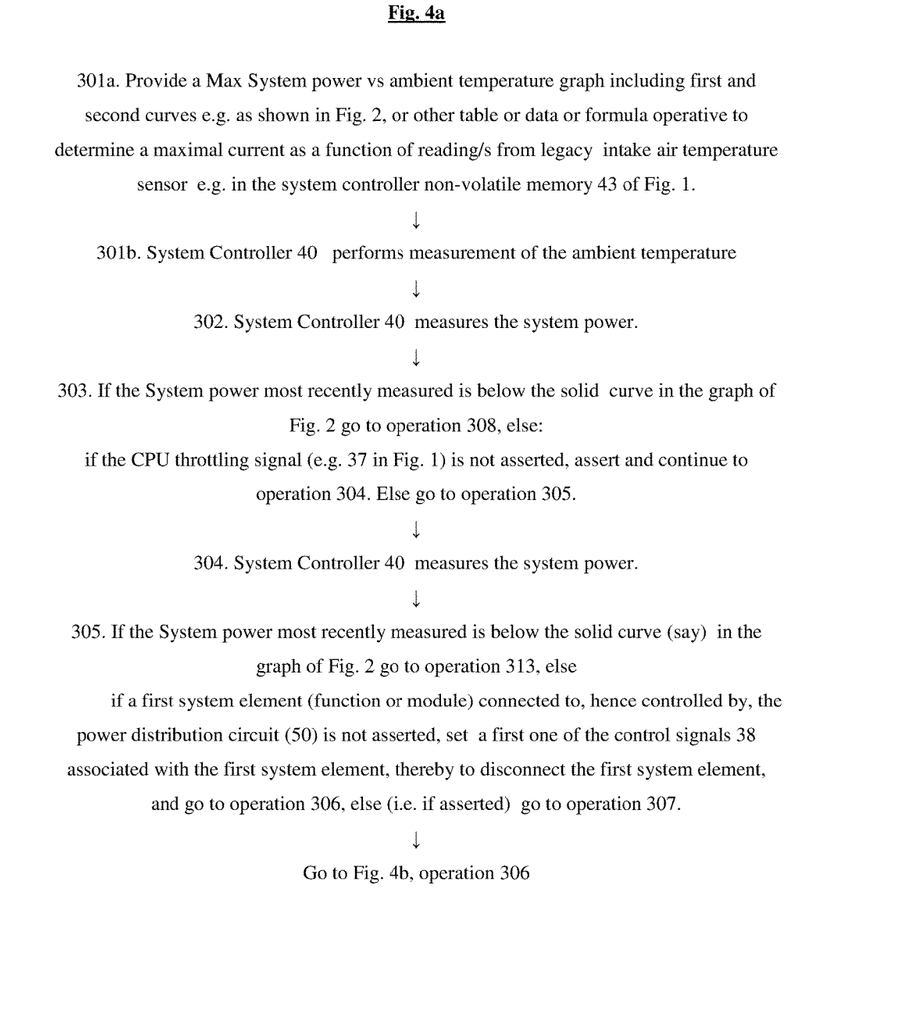
FIGS. 4a-4b, taken together, form a simplified flow illustration of a method performed by logic in a computing device having an input from an ambient temperature sensor and an output to a processor having at least one functionality which selectably limits the CPU's consumption of power from an external power supply.
Figure 4B:
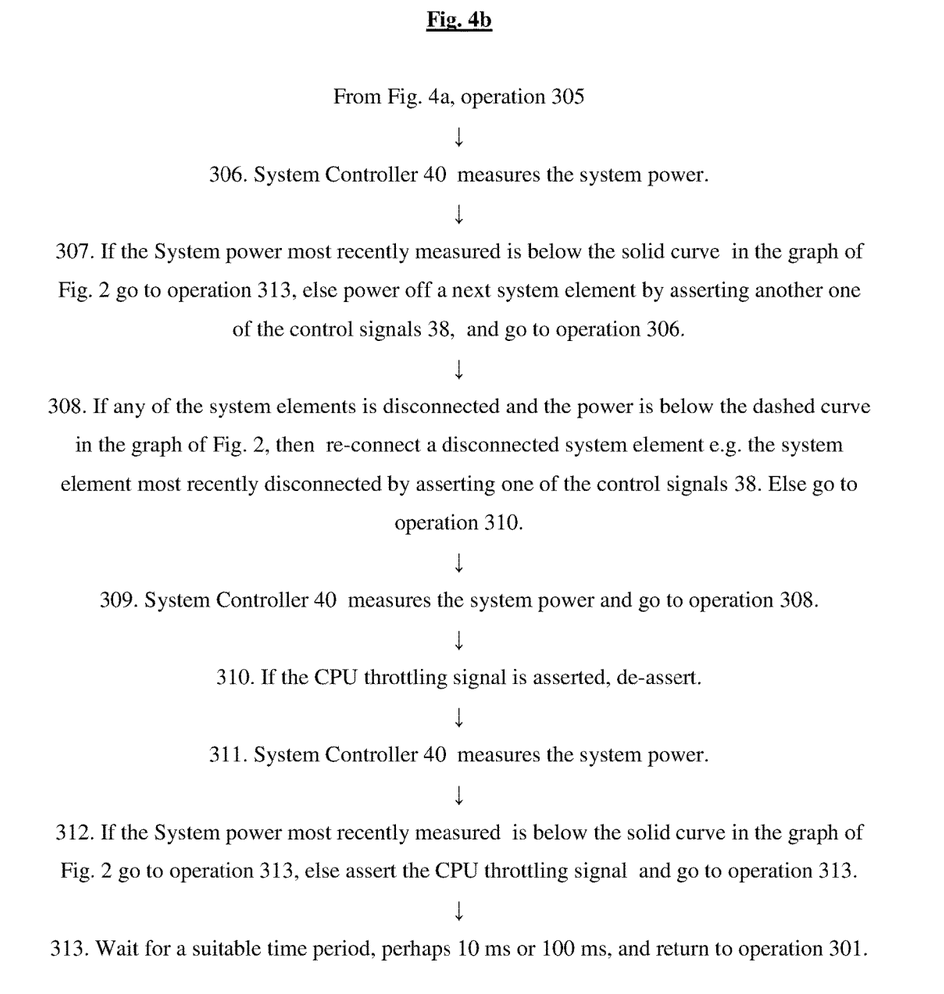

To prevent too much current from being supplied e.g. if the temperature sensor readings poorly estimate the ambient temperature, a safe fail mechanism aka cooperating power monitoring circuitry may be provided, e.g. to apply an over-temperature mechanism in the external power supply. Typically, this safety measure augments the method of FIGS. 4a-4b, taken together, described below. Alternatively, or in addition, an absolute maximal power consumption limit can be provided e.g. in the controller's SIO/EC device.

It is appreciated that the maximal current level may be computed either directly, from the intake ambient temperature as measured, or indirectly, from the estimated environment temperature (which may be estimated based on the measured intake temperature).

It is appreciated that the logic may assume that the air adjacent to the external power supply and the air adjacent the ambient temperature sensor serving PC fan, are the same temperature. Either this is true, or the air adjacent to the external power supply is warmer than the air adjacent the ambient temperature sensor, or the air adjacent to the external power supply is cooler than the air adjacent the ambient temperature sensor. If cooler, the optimization described herein is safe and an improvement over conventional systems, even if the optimization is not maximal due to the fact that the air adjacent to the external power supply is cooler than the logic described herein assumes, based on its reading for the air adjacent the ambient temperature sensor.

In a typical case, a power supply is functional at temperatures up to 60 degrees C. whereas the typical room temperature is far less, say 25 degrees C. Temperature differences inside the room, even given operation of an air conditioner or other heating or cooling device, are typically lower than 5 degrees C. So, a safety window of, say, 5 degrees C. is normally conservative enough to afford safety, while still providing plenty of range for optimization.

Alternatively, or in addition, the SIO/EC may be used to measure the power supply output level. If the temperature is high, the power regulator output voltage level may be reduced by a certain typically predetermined amount (as a result of resistance increase over temperature).

The system may include any suitable current limiting device to limit the current drawn from the external power supply such as, for example, conventional PCs' PROCHOT option which is operative to reduce the main CPU power consumption. The current limiting device may for example disconnect a USB port or reduce system power by asserting the PROCHOT# signal that reduces the main CPU power by applying main CPU clock throttling.

It is appreciated that electronic devices are more efficient at lower temperatures. There is no danger of burning at lower temperatures hence less wear out damage at these temperatures, in contrast to soldering wear out which may occur due to extraction of material, at higher temperatures. Therefore, according to certain embodiments, if the surrounding temperature is lower, this can be taken into account, such that the external power supply is functional at "higher than maximal" current levels, when relatively low ambient temperatures are detected. For example a 100 W power supply that is characterized at 60 degrees C., may provide 120 W at 25 degrees C.

It is appreciated that the teachings herein may be employed to enhance power monitoring silicon devices e.g. embedded controllers operative for providing control over system power consumption which have access to ambient temperature readings as input and monitor system power supply output levels. Logic or code according to any of the embodiments herein can be added to such devices, thereby to yield an application that facilitates higher power consumption for a given power supply. The code may for example be operative to generate a suitable event in case of overpower (given the current ambient temperature and given a predetermined maximum power consumption (aka power limit) for each ambient temperature value), to reduce CPU power consumption in case of overpower, or to deny power to predetermined device functions in case of overpower. A controller on the motherboard, such as a Super I/O in DT systems or an Embedded Controller on NB systems, may be employed for this purpose.

It is appreciated that certain embodiments of the invention are useful for a wide variety of external power supplies, or more generally to any power supply whose environmental temperature can be reliably estimated by the intake ambient temperature.

It is appreciated that certain embodiments of the invention are useful for a wide variety of electrical devices (such as but not limited to modems, printers, scanners and computers, including tablets) connected to respective external power supplies which will benefit from the ability to regulate their own power consumption (e.g. via at least one current limiting device) based on intake air temperature.

It is appreciated that any suitable ambient temperature sensor may be used herein, such as but not limited to a legacy temperature sensor which may be monitoring airflow intake temperature for a fan such as a CPU fan, or even a power supply fan.

It is believed, although this can easily be confirmed by suitable applications-specific experimentation, that for generating ambient temperature measurement, measuring the temperature at most 5 cm from the power supply, provides adequate results.

Figure 2:
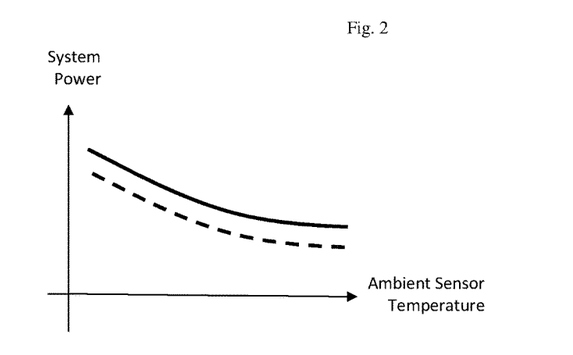
FIG. 2 is an example maximum safe system power vs. ambient temperature graph including a first solid curve and a second, "safer" curve indicated by dashed lines.

FIG. 2 is an example of maximum safe system power vs. ambient temperature graph including a first solid curve and a second, "safer" curve indicated by dashed lines, which a voltage regulator designer may provide, based on the vulnerabilities of the voltage regulator. If the temperature is of more concern than other factors, the gain from embodiments shown and described herein may be significant, although there might be a vulnerability that will limit the gain. The manufacturer of a device may measure the package temperature or internal temperature under suitable moderate temperatures relevant in most plausible device usage cases, increase the power consumed from the regulator, and log the power which is consumed when the internal or package temperature reaches maximal value. Using this data, the manufacturer can generate a maximum safe system power vs ambient temperature graph in FIG. 2, using a suitable guard band, say perhaps an adequate 5 degrees C. guard band thereby to obtain the first, solid curve, or perhaps a more conservative 10 degrees C. guard band, thereby to yield the second curve indicated by a dashed line in FIG. 2.

Figure 3:
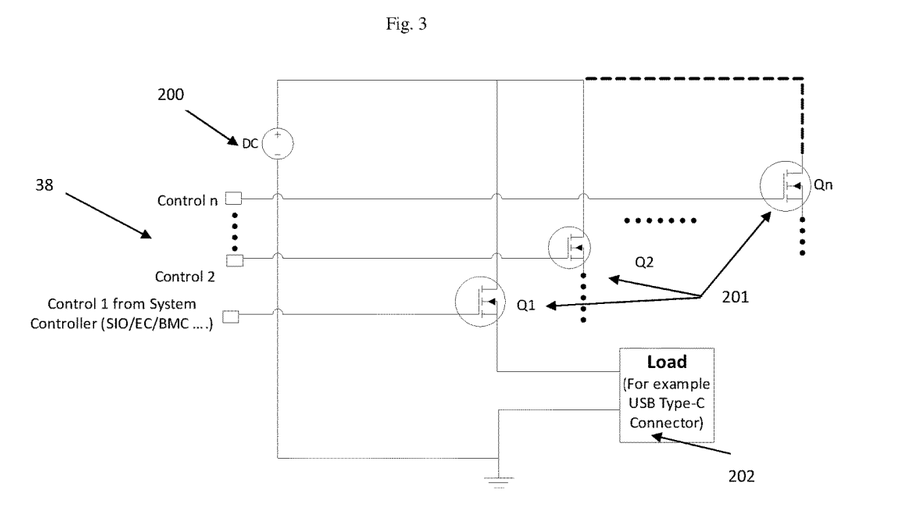
FIG. 3 is an electrical diagram of a Disconnect Circuit useful for limiting current.

It is appreciated that the system of FIGS. 1-3 and/or shown and described herein may advantageously interact with cooperating power monitoring circuitry that maintains a reasonable power consumption operation range. Power monitoring is tantamount to current monitoring when the voltage is substantially fixed, and any suitable current measurement method may be employed.

The advantage of cooperation with such power monitoring circuitry is that if power consumption exceeds a predetermined "TOO HIGH" threshold the entire system may be turned off. The "too high" threshold may for example be defined as a power level that may cause permanent physical damage. This threshold may be set by the manufacturer of the external voltage regulator 110 of FIG. 1 based on knowledge regarding absolute maximal limitations of the device for handling levels of temperature or current.

However, even if the power consumption does exceed the high range for short durations (<100 ms), the PS (power system) temperature will not change dramatically and therefore the system will remain active. It is appreciated that the waiting period's duration need not be 10 ms or 100 ms or even in between and may instead be any reasonable duration that, e.g. if pretested, does not overload the controller and still keeps system operation safe.

It is appreciated that given the above variables, in software code that runs on a specific controller, the specific controller's literature may be consulted to identify which register stores each data item mentioned above, thereby to determine where each input data item resides and to which register to feed each output data item, since the registers differ from one controller to another.

According to certain embodiments, a current limiting device limits current drawn from the external power supply by disconnecting non-critical current-drawing component/s, to keep supplied power below a safe, temperature-dependent level. Typically but not necessarily, the current limiting device comprises a disconnect circuit, e.g. as shown in FIG. 3, which comprises a single MOSFET or transistor 201, used to connect and disconnect loads (e.g. load 202) or functions e.g. via control signals 38 numbered from 2 to n and control signal 1 arriving from a SIO/EC/BMC or other system controller; MOSFET 201 may be connected to a GPIO (general-purpose input/output pin). DC source 200 may for example comprise an onboard voltage regulator that may be powered by the external voltage regulator 110 of FIG. 1.

An example method is now described (FIGS. 4a-4b, taken together,), including operations, some or all of which may be performed, in any suitable order e.g. as shown, by logic in a computing device (e.g. existing processor or controller such as the system controller 40 of FIG. 1) having an input from an ambient temperature sensor (e.g. sensor 31 of FIG. 1) and an output to a processor (e.g. circuitry 50 of FIG. 1) having at least one functionality which selectably limits the CPU's consumption of power from an external power supply e.g. by disconnecting current consuming elements e.g. USB type C interface. The logic may be configured to limit current drawn from an external power supply to no more than a maximal current computed from at least one reading from a legacy intake air temperature sensor e.g. sensor 31 of FIG. 1. The example method may include some or all of the following operations 301a-313, suitably ordered e.g. as follows:

301a. Provide a Max System power vs ambient temperature graph including first and second curves e.g. as shown in FIG. 2, or other table or data or formula operative to determine a maximal current as a function of reading/s from legacy intake air temperature sensor e.g. in the System Controller non-volatile memory 43 of FIG. 1.

301b. System Controller 40 performs measurement of the ambient temperature

302. System Controller 40 measures the system power.

303. If the System power most recently measured is below the solid curve in the graph of FIG. 2 go to operation 308, Else:
if the CPU throttling signal (e.g. 37 in FIG. 1) is not asserted, assert and continue to operation 304. Else go to operation 305.

304. System Controller 40 measures the system power.

305. If the System power most recently measured is below the solid curve (say) in the graph of FIG. 2, go to operation 313, else:
if a first system element (function or module) connected to hence controlled by the power distribution circuit (50) is not asserted, set a first one of the control signals 38 associated with the first system element, thereby to disconnect the first system element, and go to operation 306, else (i.e. if asserted) go to operation 307.

306. System Controller 40 measures the system power.

307. If the System power most recently measured is below the solid curve in the graph of FIG. 2, go to operation 313, else power off a next system element by asserting another one of the control signals 38, and go to operation 306.

308. If any of the system elements is disconnected and the power is below the dashed curve in the graph of FIG. 2, then re-connect a disconnected system element e.g. the system element most recently disconnected by asserting one of the control signals 38.
Else go to Operation 310.

309. System Controller 40 measures the system power and goes to operation 308.

310. If the CPU throttling signal is asserted, de-assert.

311. System Controller 40 measures the system power.

312. If the System power most recently measured is below the solid curve in the graph of FIG. 2, go to operation 313, else assert the CPU throttling signal and go to operation 313.

313. Wait for a suitable time period, perhaps 10 ms or 100 ms, and return to operation 301.

Figure 5:
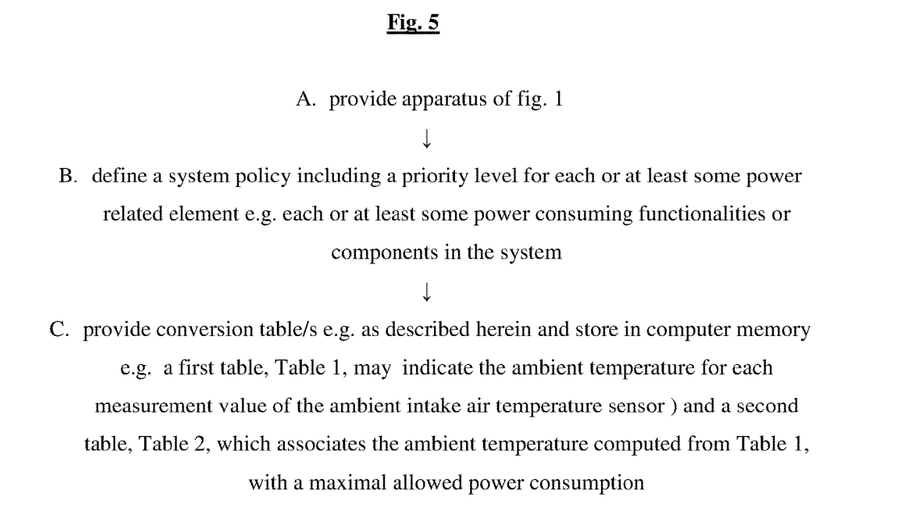
FIG. 5 is a simplified flow illustration of a set-up method which may precede normal operation of the systems shown and described herein.

According to certain embodiments, a set-up method may be provided as shown in FIG. 5, including some or all of the following operations a-c:

a. provide apparatus of FIG. 1
    b. define a system policy including a priority level for each or at least some power related element e.g. each or at least some power consuming functionalities or components in the system.

CPU throttling is a likely initial (i.e. highest priority) candidate for power reduction, followed (i.e. next in descending order of priority), perhaps, by battery charging elements through USB or USB type-c, followed (i.e. next in descending order of priority), perhaps, by external high power USB port. This can be done 'on the fly'; if a device is connected in order to be charged, it can be marked as low priority, whereas a display or speakers, which directly affect the user experience, may be higher priority devices, although display brightness may for example be reduced. Another example is a system with both a display and a charger. In order to maintain a certain power level e.g. as described herein, charging can be enabled only when the display is off.

The priority may change dependent on the system power state, for example if the system is on but the display is off.

Optionally, certain power consuming components or functionalities relying on the external power source are defined as non-critical, either unconditionally i.e. permanently non-critical, or only at certain times, or in certain situations.

Typically, the system policy defines a sequence of ordered power reduction. Operations to be applied to the non-critical components to reduce power when required—which non-critical component is first, which is next, etc., where power reduction operations are typically intended to be carried out, in the defined order, until the power is below the temperature-mandated maximum level, at which point the sequence of power reduction operations may be aborted.

c. provide conversion table/s e.g. as described herein and store in computer memory (e.g. in the non-volatile memory 43 of FIG. 1). A first table, Table 1, may indicate the ambient temperature for each measurement value of the ambient intake air temperature sensor.

The table that converts temperature measured by the intake air sensor to ambient temperature may have some correlation to system power consumption, so intake air temperature and system power consumption may both be associated with the ambient temperature in the table.

A mapping of external temperature vs ambient temperature measurement and system power consumption may be generated by measuring and recording system power consumption and measured intake air sensor (31) temperatures at a plurality of systematically varied controlled external temperatures, e.g. by the manufacturer of the system in a controlled test environment.

A second table may be provided which associates the ambient temperature computed from Table 1, with a maximal allowed power consumption, e.g. based on the max system power vs. ambient temperature graph of FIG. 2.

Generally, any suitable model, pre-tested under controlled circumstances, may be employed to compute environment temperature as a function of measured intake temperature e.g. for Table 1 above. The measured intake temperature can be tweaked or manipulated in any way to estimate the environment temperature, which, in turn, determines the current limit, or to directly determine the current limit from the measured intake temperature. For example, the measured intake temperature x can be multiplied by a factor, temperature offset can be added, or the measured intake temperature can be manipulated using a table with input and output temperatures.

The table may include a first column storing a range of intake air measured temperature values, and a second column storing estimations of the external temperature (aka ambient temperature) for each value in the first column. If the system power affects the external temperature, multiple rows of ambient temperature vs external estimated temperature may be provided for each of the plurality of system power levels.

Interpolation (linear or high order) may be employed between values in the table, if and as needed.

Example: given the following Table 1:

| | System Power | | | |
|---|---|---|---|---|
| Intake air Temperature | 10 Watt Ambient air temperature | 20 Watt Ambient air temperature | 30 Watt Ambient air temperature | 40 Watt Ambient air temperature |
| 10 | 8 | 7 | 6 | 5 |
| 20 | 18 | 17 | 15 | 13 |
| 30 | 28 | 26 | 25 | 22 |
| 40 | 38 | 35 | 33 | 30 |

Note that for a system power of 10 Watts the ambient air temperature Y is X−2 where X is the intake air temperature.

Using interpolation for the 10 Watt option, given an intake air temperature of 13 degrees C., $Y=8=((18-8)/(20-10))*(13-10)=11$ Or, analytically: Y=8+3=11. Generally, it is appreciated that to associate the temperature measured by the intake air temperature sensor and the real ambient temperature rather than using a table (intake air temperature vs. ambient temperature), or an analytic computation may be used to compute ambient temperature as a function e.g. linear function of the intake air temperature.

Advantages of certain embodiments include:

a. maintaining user experience for users of modern system architectures, for example if an individual buys an electrical device and power supply bundled and provided together, and later wants to connect her or his PC to more demanding graphics or external devices, and finds he does not have enough power. The teachings of the present invention may obviate purchasing a large power supply, later or even initially.

b. greater power supply cost effectiveness, since for a given power supply, more current is provided.

Figure 6:
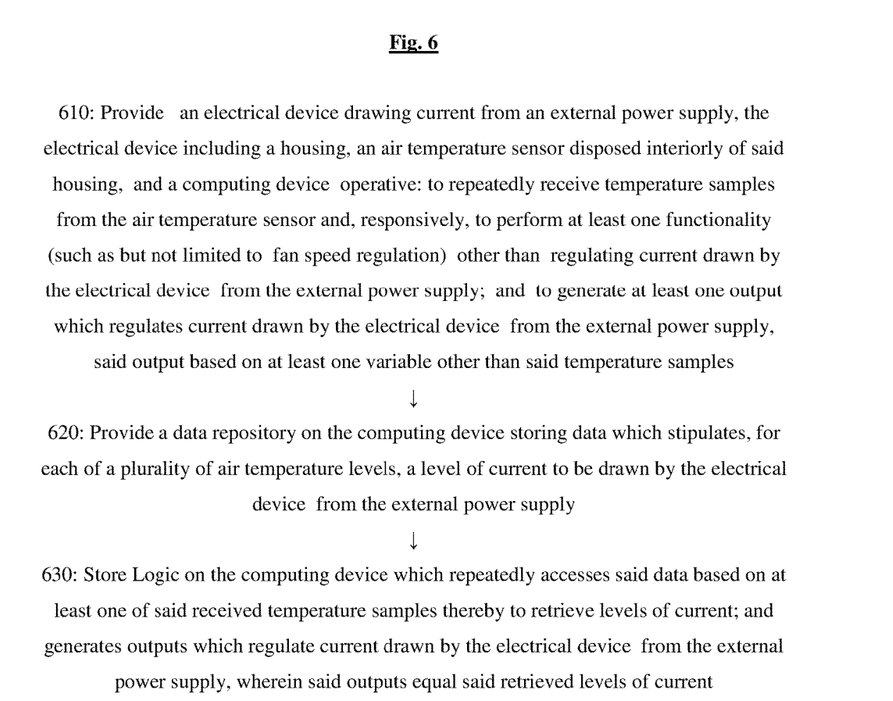
FIG. 6 is a simplified flow illustration of a method for regulating current to be drawn by an electrical device from an external power supply, in accordance with an embodiment of the invention.

It is appreciated that particular details herein are not intended to be limiting. For example, FIG. 6 shows a general method for regulating current to be drawn by an electrical device from an external power supply, in accordance with an embodiment of the invention.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order, including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Features of the present invention, including operations, which are described in the context of separate embodiments may also be provided in combination in a single embodiment. For example, a system embodiment is intended to include a corresponding process embodiment and vice versa.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

The invention claimed is:

1. Apparatus for regulating current to be drawn by an electrical device from an external power supply, the electrical device comprising an air temperature sensor, the apparatus comprising:
   a computing device including logic which repeatedly computes a maximal current to be drawn from the external power supply, including receiving at least one reading from said air temperature sensor and computing said maximal current accordingly; and
   a current limiting device to limit current drawn from the external power supply to no more than said maximal current,
   wherein said current limiting device is operative,
   to reduce, from a present level down to a new level lower than said present level, current supplied to at least one current-drawing, at present non-critical, component of said electrical device, if the total current drawn from the external power supply is apt to exceed said maximal current unless the current the non-critical component is drawing from the external power supply is reduced from the present level; and
   to increase, from the new level to a newer level higher than said new level, current supplied to said non-critical component when the current drawn from the external power supply is no longer apt to exceed said maximal current even if the non-critical component is again free to draw current from the external power supply at said newer level.

2. Apparatus according to claim 1 wherein said computing device is deployed interiorly of the electrical device.

3. Apparatus according to claim 1 wherein said receiving and computing comprises receiving plural readings from said temperature sensor and combining said plural readings to obtain a more robust temperature indication.

4. Apparatus according to claim 1 wherein said receiving and computing comprises receiving plural readings from said temperature sensor and comparing said plural readings to determine whether said air temperature is stable, increasing or decreasing, and computing a maximal current which is smaller if the temperature is increasing than if the temperature is decreasing.

5. Apparatus according to claim 1 wherein said electrical device comprises a computer.

6. Apparatus according to claim 5 wherein said computer comprises a CPU clock and wherein said current limiting device comprises a clock throttling device operative to selectably throttle the CPU clock thereby to reduce the CPU power consumption.

7. Apparatus according to claim 1 wherein said current limiting device comprises a voltage level reduction device.

8. Apparatus according to claim 1 wherein said newer level is said present level such that the current limiting device is operative to restore current supplied to the non-critical component to its pre-reduced level.

9. Apparatus according to claim 1 wherein said current limiting device is operative:
   to disconnect said non-critical current-drawing component if the total current drawn from the external power supply is apt to exceed said maximal current unless the present non-critical component is prevented from drawing current from the external power supply.

10. Apparatus according to claim 9 wherein said current limiting device is also operative to reconnect said non-critical component when the current drawn from the external power supply is no longer apt to exceed said maximal current even if the non-critical component is free to draw current from the external power supply.

11. Apparatus according to claim 1 wherein the current limiting device uses PROCHOT signals for CPU clock throttling thereby to limit power.

12. Apparatus according to claim 1 wherein the current limiting device comprises power distribution circuitry.

13. Apparatus according to claim 1 wherein said power supply comprises an external power supply housed separately from the electrical device.

14. A method for regulating current to be drawn by an electrical device from a power supply, the electrical device comprising a legacy air temperature sensor, the method comprising:
   configuring a computing device with logic which repeatedly computes a maximal current to be drawn from the power supply, including receiving at least one reading from said air temperature sensor and computing said maximal current accordingly; and
   using a current limiting device to limit current drawn from the power supply to no more than said maximal current,
   wherein the legacy air temperature sensor comprises an air temperature sensor providing air temperature readings to legacy fan speed control logic controlling speed of a legacy fan in the electrical device.

15. A method according to claim 14 wherein said power supply comprises an external power supply housed separately from the electrical device.

16. A method according to claim 14 wherein said electrical device comprises a computer and wherein said computer comprises a CPU clock and wherein said current limiting device comprises a clock throttling device operative to selectably throttle the CPU clock thereby to reduce the CPU power consumption.

17. A system for regulating current to be drawn by an electrical device from an external power supply, the electrical device including a housing, an air temperature sensor disposed interiorly of said housing, and a computing device operative:
   to repeatedly receive temperature samples from the air temperature sensor and, responsively, to perform at least one functionality other than regulating current drawn by the electrical device from the external power supply; and
   to generate at least one output which regulates current drawn by the electrical device from the external power supply, said output based on at least one variable other than said temperature samples,
   the system comprising:
   a data repository on the computing device storing data which stipulates, for each of plural air temperature levels, a maximal level of current to be drawn by the electrical device from the external power supply; and
   logic stored on the computing device which repeatedly accesses said data based on at least one of said received temperature samples thereby to retrieve maximal levels of current; and generates outputs which regulate current drawn by the electrical device from the external power supply, wherein said outputs equal said retrieved maximal levels of current, wherein said functionality comprises fan speed regulation.

18. A computer program product, comprising a non-transitory tangible computer readable medium having computer readable program code embodied therein, said computer readable program code adapted to be executed to implement a method for regulating current to be drawn by an electrical device from a power supply, the electrical device comprising a legacy air temperature sensor, the method comprising:

configuring a computing device with logic which repeatedly computes a maximal current to be drawn from the power supply, including receiving at least one reading from said air temperature sensor and computing said maximal current accordingly; and using a current limiting device to limit current drawn from the power supply to no more than said maximal current, wherein said current limiting device is operative:

to reduce, from a present level down to a new level lower than said present level, current supplied to at least one current-drawing, at present non-critical, component of said electrical device, if the total current drawn from the external power supply is apt to exceed said maximal current unless the current the non-critical component is drawing from the external power supply is reduced from the present level; and to increase, from the new level to a newer level higher than said new level, current supplied to said non-critical component when the current drawn from the external power supply is no longer apt to exceed said maximal current even if the non-critical component is again free to draw current from the external power supply at said newer level.

19. A computer program product according to claim 18 wherein said receiving and computing comprises receiving plural readings from said temperature sensor and comparing said plural readings to determine whether said air temperature is stable, increasing or decreasing, and computing a maximal current which is smaller if the temperature is increasing than if the temperature is decreasing.

20. A product according to claim 18 wherein said power supply comprises an external power supply housed separately from the electrical device.

\* \* \* \* \*